(12) United States Patent
Beveridge et al.

(10) Patent No.: US 10,120,711 B2
(45) Date of Patent: Nov. 6, 2018

(54) RAPID SUSPEND/RESUME FOR VIRTUAL MACHINES VIA RESOURCE SHARING

(71) Applicant: VMware, Inc., Palo Alto, CA (US)

(72) Inventors: Daniel James Beveridge, Apollo Beach, FL (US); David Snowdon, London (GB)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/465,491

(22) Filed: Mar. 21, 2017

(65) Prior Publication Data
US 2017/0192814 A1      Jul. 6, 2017

Related U.S. Application Data

(63) Continuation of application No. 14/615,353, filed on Feb. 5, 2015, now Pat. No. 9,619,268.

(60) Provisional application No. 62/041,045, filed on Aug. 23, 2014, provisional application No. 62/041,044, filed on Aug. 23, 2014.

(51) Int. Cl.
   *G06F 9/455*      (2018.01)
   *G06F 9/445*      (2018.01)

(52) U.S. Cl.
   CPC ........ *G06F 9/45558* (2013.01); *G06F 9/4451* (2013.01); *G06F 2009/45562* (2013.01); *G06F 2009/45575* (2013.01); *G06F 2009/45583* (2013.01)

(58) Field of Classification Search
   CPC ............... G06F 9/45558; G06F 9/4451; G06F 2009/45562; G06F 2009/45575; G06F 2009/45583

USPC .......................................................... 718/1
See application file for complete search history.

(56) References Cited

U.S. PATENT DOCUMENTS

| 6,278,448 | B1 | 8/2001 | Brown |
| 6,795,966 | B1 | 9/2004 | Lim et al. |
| 7,313,793 | B2 * | 12/2007 | Traut .................. G06F 9/45537 709/201 |
| 7,484,208 | B1 | 1/2009 | Nelson |
| 7,657,888 | B2 * | 2/2010 | Traut .................. G06F 9/45537 709/201 |
| 7,680,919 | B2 | 3/2010 | Nelson |
| 7,725,531 | B1 | 5/2010 | Sood |
| 7,971,015 | B2 | 6/2011 | Walspurger |

(Continued)

FOREIGN PATENT DOCUMENTS

GB      2 483 300      3/2012

OTHER PUBLICATIONS

S. Sahni and V. Varma, "A Hybrid Approach to Live Migration of Virtual Machines," 2012 IEEE International Conference on Cloud Computing in Emerging Markets (CCEM), Bangalore, 2012, pp. 1-5. (Year: 2012).*

(Continued)

*Primary Examiner* — Andrew M. Lyons
(74) *Attorney, Agent, or Firm* — Fish & Richardson P.C.

(57) ABSTRACT

Examples quickly suspend and resume virtual desktops on demand or on schedule. Virtual desktops, or desktops as a service, are provided to users, where the virtual desktop is a forked VM, cloned VM, or otherwise at least a partial duplicate of an existing VM. The virtual desktop points to existing memory maintained by the existing VM, and the virtual desktop only writes to memory the pages that the virtual desktop creates or modifies.

20 Claims, 7 Drawing Sheets

(56) References Cited

U.S. PATENT DOCUMENTS

| | | | |
|---|---|---|---|
| 8,015,563 B2* | 9/2011 | Araujo, Jr. | G06F 21/6218 713/1 |
| 8,151,263 B1 | 4/2012 | Venkitachalam | |
| 8,239,633 B2 | 8/2012 | Wood | |
| 8,260,904 B2* | 9/2012 | Nelson | G06F 9/45558 709/220 |
| 8,285,808 B1 | 10/2012 | Joel et al. | |
| 8,307,187 B2 | 11/2012 | Chawla et al. | |
| 8,359,594 B1 | 1/2013 | Davidson | |
| 8,413,146 B1 | 4/2013 | McCorkendale | |
| 8,464,252 B2 | 6/2013 | Schneider | |
| 8,499,191 B2 | 7/2013 | Shimada | |
| 8,555,274 B1 | 10/2013 | Chawla | |
| 8,631,066 B2 | 1/2014 | Lim | |
| 8,635,395 B2 | 1/2014 | Colbert | |
| 8,635,695 B2 | 1/2014 | Colbert | |
| 8,639,783 B1* | 1/2014 | Bakke | H04L 49/70 709/220 |
| 8,656,386 B1* | 2/2014 | Baimetov | G06F 9/45558 709/219 |
| 8,732,698 B2* | 5/2014 | Ling | G06F 9/45558 718/1 |
| 8,762,547 B2 | 6/2014 | Stanev | |
| 8,793,427 B2 | 7/2014 | Lim et al. | |
| 8,793,684 B2 | 7/2014 | Breitgand | |
| 8,806,266 B1 | 8/2014 | Qu | |
| 8,898,668 B1* | 11/2014 | Costea | G06F 9/45558 709/203 |
| 8,904,081 B1 | 12/2014 | Kulkarni | |
| 9,081,686 B2 | 7/2015 | Beveridge et al. | |
| 9,170,835 B2* | 10/2015 | Ling | G06F 9/45558 |
| 9,213,513 B2 | 12/2015 | Hartz | |
| 9,292,327 B1* | 3/2016 | von Thenen | G06F 11/1451 |
| 9,311,375 B1* | 4/2016 | Naik | G06F 17/30581 |
| 9,323,565 B2 | 4/2016 | Li et al. | |
| 9,442,752 B1 | 9/2016 | Roth | |
| 9,513,949 B2 | 12/2016 | Beveridge | |
| 9,619,268 B2 | 4/2017 | Beveridge et al. | |
| 2004/0010787 A1 | 1/2004 | Traut et al. | |
| 2004/0221290 A1* | 11/2004 | Casey | G06F 9/50 718/104 |
| 2006/0101189 A1 | 5/2006 | Chandrasekaran et al. | |
| 2006/0129627 A1 | 6/2006 | Phillips | |
| 2006/0227585 A1 | 10/2006 | Tomoda | |
| 2007/0074208 A1 | 3/2007 | Ling et al. | |
| 2007/0204121 A1 | 8/2007 | O'Connor et al. | |
| 2008/0134177 A1 | 6/2008 | Fitzgerald | |
| 2008/0155223 A1 | 6/2008 | Hiltgen et al. | |
| 2008/0163210 A1 | 7/2008 | Bowman | |
| 2008/0184225 A1* | 7/2008 | Fitzgerald | G06F 9/455 718/1 |
| 2008/0244028 A1 | 10/2008 | Le et al. | |
| 2009/0007106 A1 | 1/2009 | Araujo, Jr. | |
| 2009/0037680 A1* | 2/2009 | Colbert | G06F 3/0617 711/162 |
| 2009/0113109 A1 | 4/2009 | Nelson | |
| 2009/0125882 A1* | 5/2009 | Frigo | G06F 8/314 717/116 |
| 2009/0204718 A1 | 8/2009 | Lawton | |
| 2009/0282101 A1* | 11/2009 | Lim | G06F 9/5077 709/203 |
| 2009/0282404 A1 | 11/2009 | Khandekar | |
| 2009/0307441 A1 | 12/2009 | Hepkin | |
| 2010/0011178 A1* | 1/2010 | Feathergill | G06F 11/1466 711/162 |
| 2010/0023942 A1 | 1/2010 | Sheu et al. | |
| 2010/0070978 A1 | 3/2010 | Chawla et al. | |
| 2010/0186011 A1 | 7/2010 | Magenheimer | |
| 2010/0257523 A1* | 10/2010 | Frank | G06F 9/45558 718/1 |
| 2010/0257524 A1 | 10/2010 | Weissman | |
| 2010/0332643 A1* | 12/2010 | Benari | G06F 9/5077 709/224 |
| 2010/0332722 A1* | 12/2010 | Oiwa | G06F 9/45558 711/6 |
| 2011/0066786 A1* | 3/2011 | Colbert | G06F 9/45558 711/6 |
| 2011/0154331 A1 | 6/2011 | Ciano et al. | |
| 2011/0167195 A1* | 7/2011 | Scales | G06F 9/45558 711/6 |
| 2012/0017027 A1 | 1/2012 | Baskakov | |
| 2012/0066679 A1 | 3/2012 | Pappas et al. | |
| 2012/0084517 A1 | 4/2012 | Post | |
| 2012/0110574 A1 | 5/2012 | Kumar | |
| 2012/0144391 A1 | 6/2012 | Ueda | |
| 2012/0151477 A1 | 6/2012 | Sinha | |
| 2012/0159478 A1 | 6/2012 | Spradlin | |
| 2012/0204060 A1 | 8/2012 | Swift et al. | |
| 2012/0216185 A1 | 8/2012 | Dai | |
| 2012/0240110 A1* | 9/2012 | Breitgand | G06F 9/45558 718/1 |
| 2012/0246645 A1 | 9/2012 | Ilkura | |
| 2012/0254889 A1 | 10/2012 | Demkowicz | |
| 2012/0272236 A1 | 10/2012 | Baron | |
| 2012/0324446 A1* | 12/2012 | Fries | G06F 21/64 718/1 |
| 2012/0331465 A1* | 12/2012 | Tanikawa | G06F 9/5077 718/1 |
| 2013/0047160 A1 | 2/2013 | Conover | |
| 2013/0067289 A1 | 3/2013 | Maislos et al. | |
| 2013/0097377 A1 | 4/2013 | Satoyama | |
| 2013/0111474 A1 | 5/2013 | Agarwal et al. | |
| 2013/0174096 A1 | 7/2013 | Lewin | |
| 2013/0198745 A1 | 8/2013 | De et al. | |
| 2013/0246355 A1 | 9/2013 | Nelson | |
| 2013/0254383 A1* | 9/2013 | Wray | H04L 47/70 709/224 |
| 2013/0263119 A1* | 10/2013 | Pissay | G06F 9/45558 718/1 |
| 2013/0282792 A1* | 10/2013 | Graham | G06F 9/4445 709/203 |
| 2013/0332610 A1 | 12/2013 | Beveridge et al. | |
| 2013/0332920 A1 | 12/2013 | Laor | |
| 2014/0040887 A1 | 2/2014 | Morariu | |
| 2014/0047193 A1 | 2/2014 | Gross et al. | |
| 2014/0068181 A1 | 3/2014 | Mridha et al. | |
| 2014/0075127 A1 | 3/2014 | Garthwaite | |
| 2014/0115228 A1 | 4/2014 | Zhou et al. | |
| 2014/0130040 A1* | 5/2014 | Lemanski | G06F 9/4856 718/1 |
| 2014/0137112 A1* | 5/2014 | Rigolet | G06F 9/45558 718/1 |
| 2014/0156910 A1 | 6/2014 | Uttamchandani et al. | |
| 2014/0164718 A1 | 6/2014 | Van Schaik | |
| 2014/0164723 A1* | 6/2014 | Garthwaite | G06F 12/16 711/162 |
| 2014/0173181 A1 | 6/2014 | Beveridge | |
| 2014/0173196 A1 | 6/2014 | Beveridge et al. | |
| 2014/0173213 A1 | 6/2014 | Beveridge | |
| 2014/0215172 A1 | 7/2014 | Tsirkin | |
| 2014/0244950 A1 | 8/2014 | Baron et al. | |
| 2014/0245294 A1 | 8/2014 | Kayl | |
| 2014/0366019 A1 | 12/2014 | Bajaj | |
| 2015/0046925 A1* | 2/2015 | Costea | G06F 9/45558 718/1 |
| 2015/0058580 A1 | 2/2015 | Lagar Cavilla | |
| 2015/0058837 A1 | 2/2015 | Govindnankutty | |
| 2015/0067390 A1 | 3/2015 | Blake | |
| 2015/0089496 A1 | 3/2015 | Thankappan et al. | |
| 2015/0178108 A1 | 6/2015 | Tarasuk-Levin | |
| 2015/0178110 A1 | 6/2015 | Li et al. | |
| 2016/0055016 A1 | 2/2016 | Beveridge | |
| 2016/0055021 A1 | 2/2016 | Beveridge et al. | |
| 2016/0170788 A1 | 6/2016 | Tarasuk-Levin | |
| 2016/0217001 A1 | 7/2016 | Li et al. | |

OTHER PUBLICATIONS

X. Shi, C. Liu, S. Wu, H. Jin, X. Wu and L. Deng, "A Cloud Service Cache System Based on Memory Template of Virtual Machine,"

(56) References Cited

OTHER PUBLICATIONS

2011 Sixth Annual Chinagrid Conference, Liaoning, 2011, pp. 168-173. (Year: 2011).*
R. Singh and P. Graham, "Performance Driven Partial Checkpoint/Migrate for LAM-MPI," 2008 22nd International Symposium on High Performance Computing Systems and Applications, Quebec City, Que., 2008, pp. 110-116. (Year: 2008).*
International Search Report and Written Opinion received in co-pending International Patent Application No. PCT/US2015/046177, filed Aug. 20, 2015. dated Oct. 30, 2015. 11 pages.
Liu, H. et al. *Live Virtual Machine 1-20 Migration via Asynchronous Replication and State Synchronization.* IEEE Transactions on Parallel and Distributed Systems, vol. 22, No. 12. Los Alamitos, CA. Published Dec. 1, 2011. 14 pages.
International Search Report and Written Opinion received in co-pending International Patent Application No. PCT/US2015/046178, filed Aug. 20, 2015. Received Oct. 26, 2015. 11 pages.
"Atlantis ILIO in XenApp Environments, 1-20 1". Published Apr. 1, 2014. Retrieved on Oct. 15, 2015. Retrieved from the Internet: URL:<http://web.archive.org/web/20140701144808/http://atlantiscomputing.com/downloads/WPAtlantisILIOinXenAppEnvironments20140424.pdf >. 2 pages.
"Atlantis ILIO Diskless VDI for VMware View". Published Jan. 24, 2014. Retrieved Oct. 15, 2015. Retrieved from the Internet: URL:<http://web.archive.org/web/20140124082015/http://www.atlantiscomputing.com/downloads/DisklessVDI Solution Brief VMWare.pdf>. 2 pages.
Vrable, M. et al. "Scalability, fidelity, and containment in the Potemkin virtual honeyfarm". ACM SIGOPS Operating Systems Review. Published Oct. 20, 2005. Retrieved from the Internet: URL:<http://portal.acm.org/citation.cfm?id=1095825>. 15 pages.
USPTO, "Non-final Office Action in U.S. Appl. No. 14/136,701", dated Jun. 18, 2015, 10 pages.
Unknown, "Project Serengeti", accessed at «http://www.projectserengeti.org», accessed on Dec. 19, 2013, 2 pages.
Unknown, "Welcome to Apache Hadoop!", accessed at «http://hadoop.apache.org», Dec. 12, 2013, 4 pages.
Unknown, "Horizon View", accessed at <<http://www.vmware.com/products/horizon-view>>, accessed on Dec. 19, 2013, 6 pages.
Unknown, "Cloud Foundry Community", accessed at «http://www.cloudfoundry.org», accessed on Dec. 19, 2013, 2 pages.
Lagar-Cavilla et al., "SnowFlock: Virtual Machine Cloning as a First Class Cloud Primitive", ACM Transactions on Computing Systems., vol. 29(1), Feb. 2011, 50 pages.
Lagar-Cavilla et al., "SnowFlock: Rapid Virtual Machine Cloning for Cloud Computing," ACM, Euro Sys '09, Apr. 1-3, 2009.
Morin, Christine and Puaut, Isabelle, "A Survey of Recoverable Distributed Shared Virtual Memory Systems," IEEE Transactions on Parallel and Distributed Systems, vol. 8, No. 9, Sep. 1997.
Unknown, "What's new in private Paas? Introducing OpenShift Enterprise 2.0", accessed at «http://www.redhal.com/aboul/events-webinars/webinars/2013-12-17-openshifl-enterprise-2», accessed on Dec. 19, 2013, 1 page.
Unknown, "OpenShift Platform Features", Benefits Document, Red Hat, Inc., 2012, 5 pages.
Unknown, "SnowFlock: Swift VM Cloning for Cloud Computing", accessed at «http://sysweb.cs.toronto.edu/snowflock>>, accessed on Dec. 19, 2013, 2 pages.
Unknown, "Virtual Memory Streaming", OpenStack, Gridcentric, Inc., 2013, 2 pages.
Unknown, "RemoteApp for Hyper-V", Remote Desktop Services Blog, accessed at «http://blog.msdn.com/b/rds/ archive/2009/12/15/remoteapp-for-hyper-v.aspx», Dec. 2009, 5 pages.
Unknown, "LXC", accessed at «http://en.wikipedia.org/wiki/LXC», accessed on Dec. 19, 2013, 2 pages.
Unknown, "Linux-VServer", accessed at «http://en.wikipedia.org/wiki/Linux-VServenr», accessed on Dec. 19, 2013, 3 pages.
Yu et al., "A Feather-weight Virtual Machine for Windows Applications," ACM, VEE '06, Jun. 14-16, 2006.
Non-final Office Action dated Mar. 26, 2015 for U.S. Appl. No. 13/764,405, 23 pages.
Non-final Office Action dated Mar. 27, 2015 for U.S. Appl. No. 13/764,516, 21 pages.
Deng et al., "Fast Saving and Restoring Virtual Machines with Page Compression," 2011 International Conference on Cloud and Service Computing, IEEE 2011, pp. 150-157.
Yun et al., "Providing Extra Memory for Virtual Machines by Sharing Compressed Swap Pages," 2015 IEEE International Conference on Consumer Electronics, 2014, pp. 430-431.
Ashley, Bruce S., Office Action, U.S. Appl. No. 14/136,621, dated Aug. 26, 2016, 27 pages.
Bryant, et al., "Kaleidoscope: Cloud Micro-Elasticity via VM State Coloring", Eurosys '11, Apr. 10-13, Salzburg, Austria, 14 pages.
The Linux Juggernaut, ""Linux Booting Process Explained,"" Apr. 5, 2013, [retrieved on Feb. 21, 2018]. Retrieved from the Internet: URL: <http://www.linuxnix.com/linux-booting-processexplained/>. 4 pages.
Mills, Paul V., "Office Action", U.S. Appl. No. 14/136,661, dated Jun. 16, 2016, 17 pages.
Notice of Allowance and Fees Due, U.S. Appl. No. 14/136,701, dated Dec. 18, 2015, 13 pages.
Shi, et al., "A Cloud Service Cache System Based on Memory Template of Virtual Machine," Published: 2011, 6 pages.
USPTO, "Non-Final Office Action in U.S. Appl. No. 14/136,661", dated Mar. 3, 2016, 12 pages.
USPTO, "Non-final Office Action in U.S. Appl. No. 14/136,741", dated Dec. 3, 2015, 9 pages.
USPTO, Non-final Office Action in U.S. Appl. No. 14/615,366, dated Nov. 20, 2015, 10 pages.
Wang, et al., "Rethink the Virtual Machine Template," In Proceedings of VEE'11, Mar. 9-11, 2011, Newport Beach, California, USA, 11 pages.

* cited by examiner

RAPID SUSPEND/RESUME FOR VIRTUAL MACHINES VIA RESOURCE SHARING

CROSS-REFERENCE TO RELATED APPLICATIONS

This application is a continuation of U.S. patent application Ser. No. 14/615,353, filed on Feb. 5, 2015, which claims the benefit of U.S. Provisional Patent Application Ser. No. 62/041,044, filed Aug. 23, 2014 entitled "Rapid Suspend/Resume for Virtual Machines via Resource Sharing" and U.S. Provisional Patent Application Ser. No. 62/041,045, filed Aug. 23, 2014 entitled "Machine Identity Persistence for Users of Non-Persistent Virtual Desktops." The foregoing applications are incorporated here by reference in their entireties.

This application is related to U.S. Non-Provisional patent application Ser. No. 14/615,366, filed Feb. 5, 2015, entitled "Machine Identity Persistence for Users of Non-Persistent Virtual Desktops", and now U.S. Pat. No. 9,513,949, which is incorporated by reference herein in its entirety.

BACKGROUND

Virtual desktops enable the same infrastructure to serve many users. A stateless virtual desktop infrastructure (VDI) offers improved density by allowing any user to connect to any virtual machine (VM) desktop. For example, this allows shift workers (e.g., task workers) to share a common set of VMs, thereby reducing the set of VMs that need to be serviced by infrastructure to only what is needed to serve concurrent users rather than all existing users. In certain environments, such as hospitals that run 24 hours, these gains may reduce the VMs needed to approximately one-third of what might otherwise be needed to serve three shifts.

However, stateless desktops are less effective for users with more complicated processing needs. For example, knowledge workers tend to have long running sessions that must survive across many connect and disconnects. Knowledge workers often open many applications, work on multiple documents simultaneously, and tend to have applications positioned across the various screens in ways that require some effort to configure at login. Such users prefer to disconnect while the applications are running, and resume those applications at a later time (e.g., even days or weeks later) without ever logging out. However, stateless designs do not exhibit nearly the same efficiency for knowledge workers (as compared to task workers) because many idle VMs accrue as knowledge workers initiate sessions and later disconnect.

Some existing systems suspend all data associated with the VM, but for knowledge workers who may have larger memory allocations (e.g., 2 GB to 4 GB), there is much data to be moved back and forth between random access memory (RAM) and the storage system. As such, the existing systems are very input/output (I/O) intensive, potentially flooding already saturated storage resources that often struggle to deliver I/O in support of a quality VDI user experience. As an example, an ESX host from VMware, Inc. may host 100 VDI sessions of 4 GB each. If a suspend on disconnect policy is in place, and most of the users disconnect near the end of their work day, there is 400 GB of data needing to be written from RAM in the hypervisor to the storage system to prepare the ESX host for a new set of incoming users. In a larger cluster of perhaps 8 ESX hosts, a traditional shared array might be subject to 400 GB×8, or 3.2 TB of data flowing from the cluster as a result of such a policy. This I/O surge of writes takes a long time to complete and poses a substantial risk to experience of any remaining users. The surge may also inhibit the ability of the VDI cluster to properly serve users attempting to initiate new VDI sessions during this window of time.

In addition to massive "write-storms", there is a severe challenge when users with suspended VMs return later to access their VMs. Upon logging in, users must wait for their VM to be reanimated. The wait time depends on retrieval of their machine state from the storage system. The transfer of a 2 GB to 4 GB of session data back into RAM takes time, as much as several minutes depending on the performance of the storage system at the time of the request. If many users need to retrieve their machines within a narrow time window such as around the beginning of the workday, the storage system is subject to large "read-storms" that further amplify the delays users experience and further degrade the I/O performance for users attempting to work.

Some existing solutions focus on use of flash technologies to ensure a more reliable and faster resume path than was available using hard drive technology, but these approaches do not significantly reduce the quantity of data involved and are thus, at the very least, inefficient.

SUMMARY

The present disclosure permits rapid suspension and resumption of operation of a virtual machine (VM). Aspects of the disclosure permit a child VM to share memory and storage with a parent VM. The child VM only tracks and records its own writes to memory, creating copy-on-write (COW) pages. When a request for suspension of the child VM is received, the child VM compresses the COW pages and transfers them to storage. The compressed COW pages are then decompressed, in some examples, only upon demand after the child VM is resumed.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
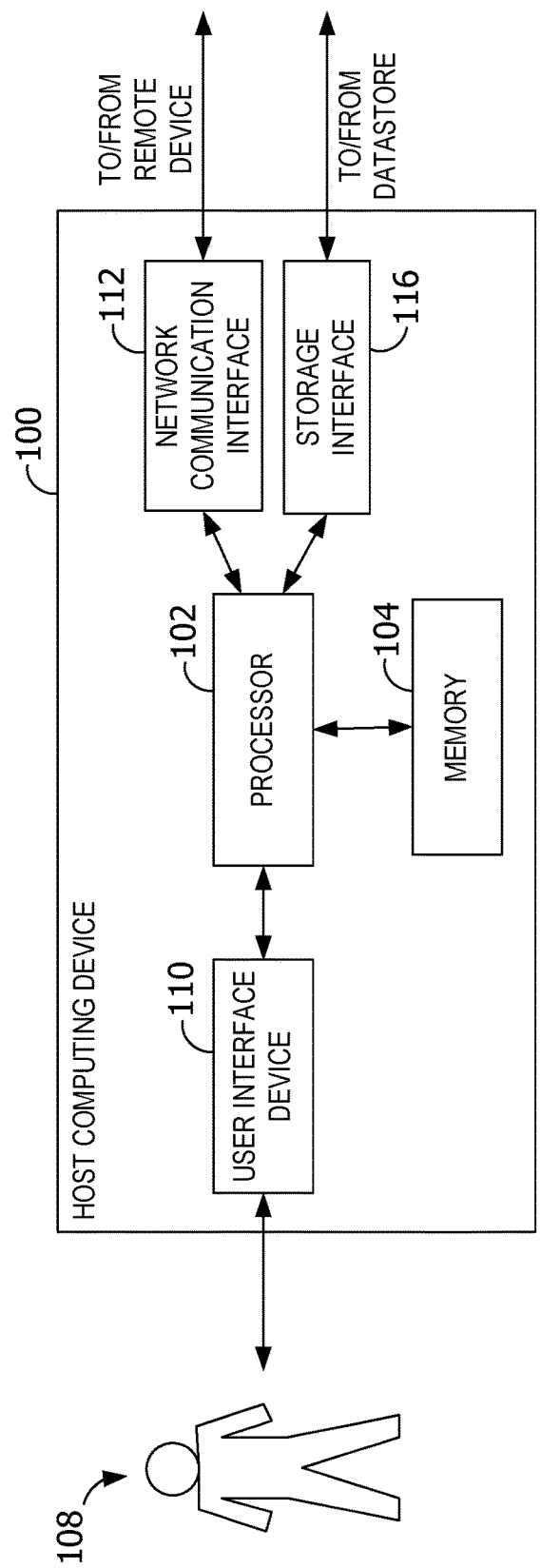
FIG. 1 is a block diagram of an exemplary host computing device.

The present disclosure achieves rapid suspend and resume functionality for virtual desktops while eliminating most of the large input/output (I/O) burden associated with traditional VM suspend/resume activities. Among other items, rapid suspend and resume of virtual desktops increases density in the desktop as a service (DaaS) arena.

Some aspects of the disclosure describe a suspend and resume path for VMs which leverages resource sharing such as with forking, hot cloning, and the like. For example, VMFork from VMware, Inc. allows a parent VM to remain resident in host memory which becomes the template for hot cloning of child VMs which initially share all of its memory pages but which generate their own copy-on-write (COW) memory pages as they execute. The disclosure suspends a VM by processing only these COW memory pages to greatly reduce the number of memory pages that need to be processed. Initially, in some examples, these pages are compressed and held in memory based on a policy period and later evicted to the storage system. These pages may be later copied back to RAM upon user demand or proactively in anticipation of user demand based on previous user activity. The combination handling only COW pages and first compressing them in a staging area may reduce the data volume that goes to disk (e.g., as much as 90% in some examples), leaving a more manageable quantity of data flowing between RAM and storage. In some examples, the staging area is a logical portion of RAM that has been allocated, dedicated, designated, assigned, and/or formatted to contain compressed memory pages. Size limits may be imposed on the staging area (e.g., first-in first-out, aging-based policy evictions, etc.) and/or other maintenance operations.

Examples described herein quickly suspend and resume virtual desktops on demand by users. The virtual desktops are clones of permanently existing VMs, or forked from existing VMs, which the virtual desktops rely upon as a template. The memory utilized by the cloned or forked virtual desktop, or child VM, is maintained by a parent VM whose template was utilized to create the child VM. The child VM only writes to memory pages that the child VM independently creates or modifies. From the hypervisor perspective, there are two classes of pages: those maintained by the parent (e.g., the child VMs initially include just pointers to parent VM pages), and ones generated and maintained by the child VM, hereafter referred to as copy-on-write (COW) pages.

Some examples of the rapid suspend/resume design described herein take advantage of such sharing capabilities to segment or otherwise separate shared from non-shared memory pages in a way that allows reduced input/output (I/O) transfers when saving state to storage. Some examples also leverage memory page compression capability to proactively stage compressed memory pages in random access memory (RAM) as a means of providing ultra-rapid resume of desktops. After a policy based residency period in the staging mechanism, compressed memory pages evict to disk with an estimated 90% reduction in data flows as compared to traditional suspend operations. Based on user activity patterns, users who regularly reconnect to their desktops at predictable times may be proactively restaged in RAM for the best user experience. Aspects of the disclosure rapidly evict idle desktops from shared infrastructure, resulting in reduced charges per desktop.

Aspects of the disclosure leverage memory page tracking and segmentation to achieve significant data reduction.

Aspects of the disclosure accommodate the needs of knowledge workers while driving better densities for cost conscious virtual desktop infrastructure (VDI) adopters and for Desktop as a Service (DaaS) solutions.

Aspects of the disclosure preserve user state while simultaneously pruning the idle VMs to drive better density.

Aspects of the disclosure reduce the amount of data processing on the host, increase the speed of the host and other devices, reduce an amount of data being transferred from RAM to storage, improve the functioning of the host itself, reduce the set of VMs that need to stay resident in hypervisor RAM, service a greater quantity of named users on the same infrastructure (e.g., rotate people on and off the same resources for improved user rotation efficiency), reduce power consumption (e.g., reduced use of memory reduces power consumption), reduce processor load, reduce network bandwidth usage, improve operating system resource allocation, and/or increase efficiency.

Some operations described herein are described in the context of forking operations, such as those provided by VMFork from VMware, Inc. Forking, and VMFork in particular, differs from linked clones for VM instantiation. Linked clones are a storage construct, whereas VMFork is a memory construct and a storage construct. VMFork uses linked clones but also has a COW memory strategy such that all content is initially shared and changes are tracked as COW memory pages for each child VM. For example, while some linked VM clones use small delta disks that reference a larger base disk of another VM, these systems lack a mechanism for online customization of the instantiated VMs (e.g., performed while the VMs are powered-on). For example, as linked VM clone functionality does not inherently include customization, some of the existing systems rely on offline domain join techniques (e.g., performed while the VMs are powered-off). As another example, these systems are unable to configure instantiated VMs with different states. Further, many guest operating systems require rebooting, or other operations with a high time cost, to set identities within the instantiated VMs due to restrictions at the operating system level.

VMFork-based desktops entail the ability to know at the hypervisor level which memory pages in the desktop VM are shared and which are unique. The VMFork parent VM initially shares all its memory pages with child VMs. Each memory page changed by the child VM is called a COW memory page. Thus, for VMFork based VMs, a suspend operation by the hypervisor writes only these COW memory pages to disk rather than the full memory space of the VM. So long as the VMFork parent remains resident in memory on each host, a resume operation loads only the COW pages back into memory and re-attaches them to the VMFork parent logically. This is a form of logical deduplication. The VM may be powered on by logically merging it with the contents of the replica on the fly, presenting what appears to be a standalone disk and memory image for each VM.

VMFork-based desktops initially share all of their memory pages but over time as users conduct their desktop activities, more COW memory pages will be generated. For shorter running sessions or sessions where only a few applications are used, the percentage of memory pages that remains shared with the VMFork parent may remain high (e.g., over 90%). The ability to eliminate the shared memory pages represents a significant advance, reducing the amount of data handled by a suspend/resume operation by, for example, 75%.

VMFork-aware suspend/resume attempts to reduce the quantity of data handled by the storage system through the elimination of shared memory pages. Alternatively or in addition, a way to both enhance user experience and limit the remaining storage burden is to recognize that many users will reconnect to their VMs within a short period such as 24 hrs. Aspects of the disclosure handle these shorter-term idle periods in a way that avoids loading the storage system and also offers a nearly instant re-animation of the virtual desktop upon user request. One example is to target the COW memory pages and compress them using memory page compression built into the hypervisor. Compression of memory pages may occur when the host is under memory pressure to avoid swapping activity by the host. However, the advanced suspend/resume strategy described herein may compress all COW pages and later evict them to disk after a policy based expiration (e.g., 16 hours, or the typical time between end of workday and the next morning when users are likely to resume their desktop). Resuming a VM whose memory pages are already in RAM is faster. The VM to be resumed is made live almost immediately and its memory pages may be decompressed asynchronously as the user starts to work on it with accessed pages being decompressed on-demand. In some cases, the VM's memory pages remain in their original locations within the hypervisor for a policy period, then they may be compressed but still held in memory, and only later, sent to disk. A resume operation may, in some examples, involve resuming the scheduling of the previously suspended or 'stunned' VM; but in other cases, it may involve retrieval of a limited set of memory data from disk.

This compressed staging pool provides nearly instant reanimation of desktops for users who return within the policy period and greatly reduced data flows for users outside the policy period by compressing the set of COW pages before sending them down to the storage system. In some examples, use of low-latency flash storage systems may accelerate the remaining and already reduced data flow of suspend and resume operations.

In this context, the suspend and resume of the already curtailed set of COW memory pages may be executed rapidly. The staging pool ensures that the COW memory pages are already compressed, further reducing the volume of data that must be sent and retrieved from an all-flash virtual storage array network (vSAN) target design or other high-speed storage system. As a prophetic example, if the VMFork-aware strategy reduces the volume of data by 75%, compression obtained during the initial residency in the staging pool may further reduce data volume by 60% (e.g., based on typical zLib compression) leaving only 10% of the original data volume to be sent down to disk and retrieved on-demand.

Given that recently written data remains resident in a caching tier of vSAN (Virtual SAN) by VMware, Inc. for some time, some example resume operations import this already-reduced amount of data from high performance flash devices such as the Memory Channel Storage flash on dual in-line memory module (DIMM) technology that achieves over 1 gigabyte/second and latencies under 20 microseconds. For a 4 GB desktop, 10% is 400 MB which is retrievable in a brief enough period so as to avoid irritating the user waiting to regain access to their desktop upon authenticating to the VDI broker or otherwise logging in.

Another example includes a policy-based proactive retrieval element to reduce delay when granting a virtual desktop to a user. Retrieval from storage back to the staging area or pool may be performed based on any criteria. The criteria may be defined based on heuristics, and may be performed proactively (e.g., ahead of user re-connection points). For example, an initial residency period in the stage pool such as 4 hours may be followed by eviction to the storage tier to reduce memory needed to maintain the pool. However, for users with a record of logging in regularly, a heuristic analysis may provide the average time of day when they reconnect to the system. The compressed pages of the VM may be proactively retrieved from storage and placed back into the staging area to ensure a very rapid resume. The transfer of contents between the staging area and vSAN may be flow controlled to avoid excessive I/O storms. If a host supporting 100 users with 4 GB each may reduce the compressed and VMFork aware set of COW pages down to just 10% or 400 megabytes per user, the staging pool may accommodate the contents of all 100 users with only 40 GB of RAM or 10% of the total system RAM. Assuming that some users go on vacation or don't use their desktop each day, most users may achieve a resume from RAM level of service most of the time from the staging pool using approximately only 70% of the total requirement or roughly 30 GB, which is just 7% of host's system RAM.

In some examples, the retrieval aspects (e.g., from storage back to the staging area in RAM) rely on a history log, or other maintained history data describing user connect habits, disconnect habits, re-connect habits, and/or other user behavior cycles. The history data includes, for example, time stamps for each of these activities. The history data may be maintained as an audit trail from a virtual desktop broker, or other server (e.g., DaaS management server). The history data may be derived from machine learning algorithms, in some examples. Further, the retrieval aspects described herein may be implemented in addition to, or separate from, the resource sharing operations and the compression operations.

While described with reference to VMFork in some examples, those skilled in the art will note that any infrastructure, operations, components, and/or configuration of hardware, software, and/or firmware implementing the operations (or their equivalents or variations) described herein are within the scope of the disclosure.

Further, the operations described herein are not limited to improving suspend/resume of virtual desktops. Rather, aspects of the disclosure operate to avoid idle machines consuming resources. For example, one or more of the operations are operable in web farms to collapse portions of the web farms during period of less demand, and to resume portions of the web farms when demand increases. Suspending and resuming the portions of the web farms are better (e.g., faster, with less CPU cycles, etc.) than rebooting those portions of the web farms.

An example of a virtualized environment is next described.

FIG. 1 is a block diagram of an exemplary host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid-state disks, and/or optical disks. In FIG. 1, memory 104 refers to memory and/or storage. However, in some examples, memory 104 may refer only to memory in host computing device 100, and exclude storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as vCenter Server from VMware, Inc. or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In some examples, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
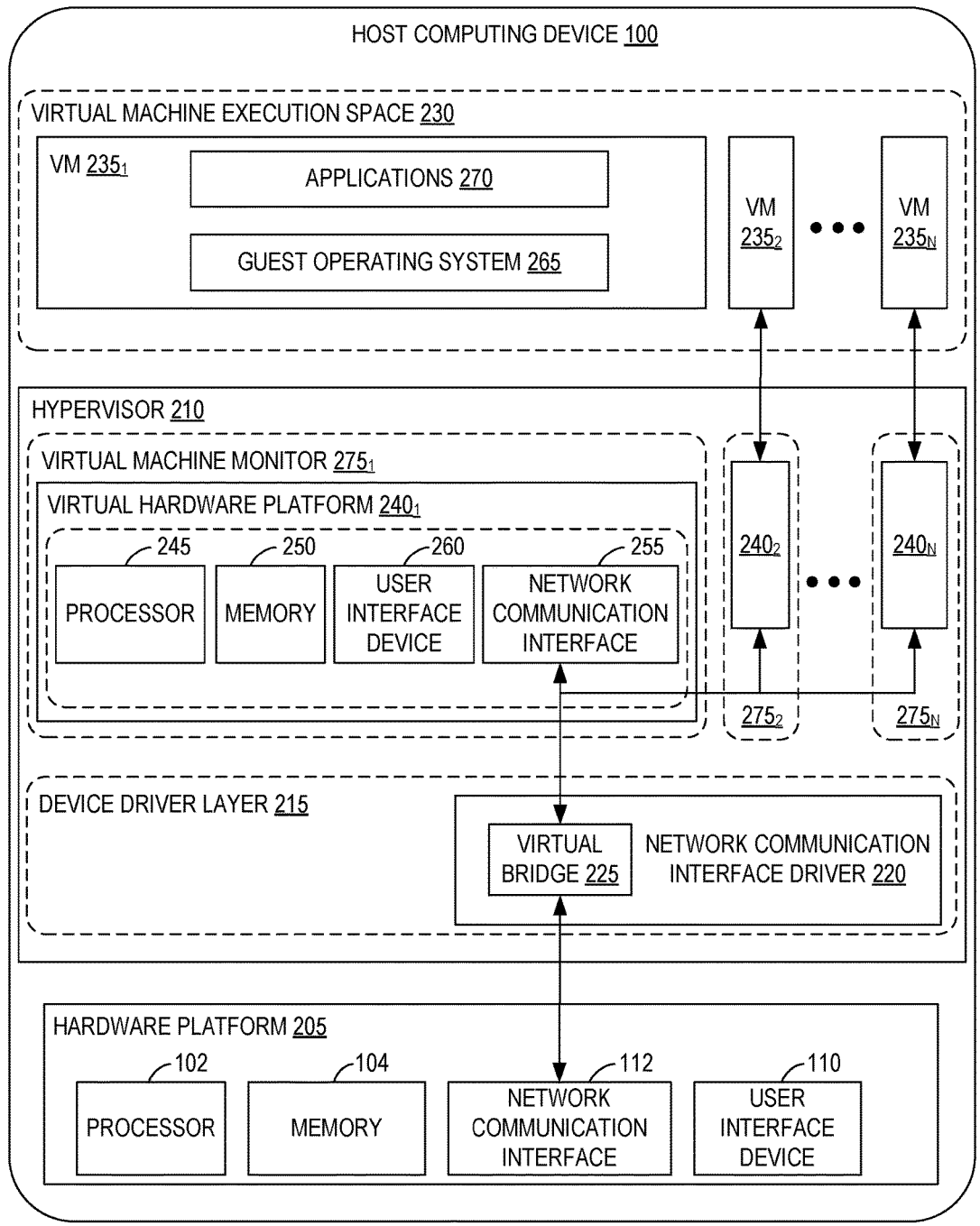
FIG. 2 is a block diagram of virtual machines that are instantiated on a computing device, such as the host computing device shown in FIG. 1.

FIG. 2 depicts a block diagram of virtual machines $235_1$, $235_2 \ldots 235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106. A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid-state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Aspects of the disclosure are operable with any computer architecture, including non-x86-compatible processor structures such as those from Acorn RISC (reduced instruction set computing) Machines (ARM), and operating systems other than those identified herein as examples.

Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an example of the disclosure is included as a component in VMware's ESX brand software, which is commercially available from VMware, Inc.

The host computing device may include any computing device or processing unit. For example, the computing device may represent a group of processing units or other computing devices, such as in a cloud computing configuration. The computing device has at least one processor and a memory area. The processor includes any quantity of processing units, and is programmed to execute computer-executable instructions for implementing aspects of the disclosure. The instructions may be performed by the processor or by multiple processors executing within the computing device, or performed by a processor external to computing device. In some examples, the processor is programmed to execute instructions such as those illustrated in the figures.

The memory area includes any quantity of computer-readable media associated with or accessible by the computing device. The memory area, or portions thereof, may be internal to the computing device, external to computing device, or both.

Figure 3:
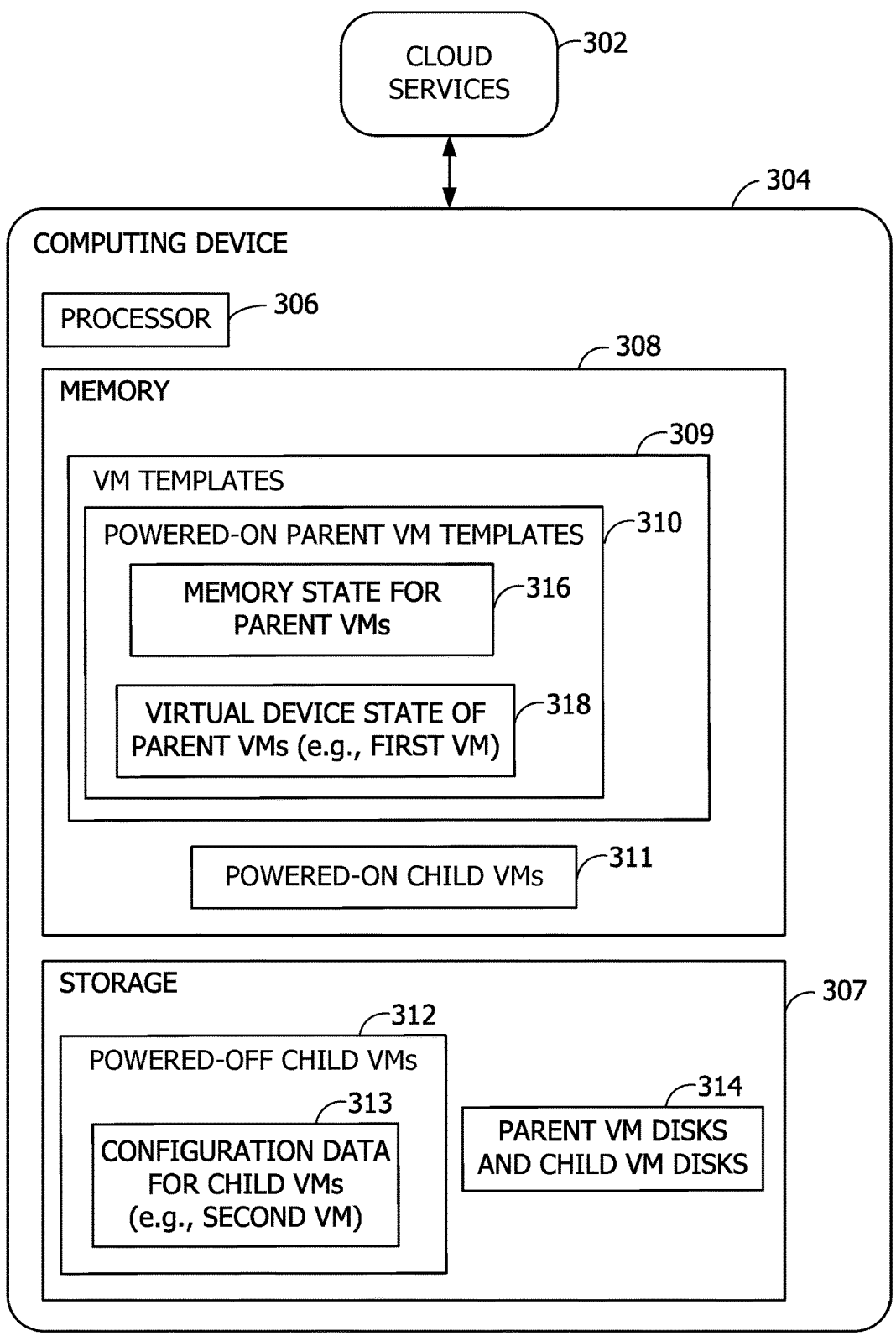
FIG. 3 is a block diagram of an exemplary system that utilizes cloud services to create, store, and retrieve child VMs.

FIG. 3 is a block diagram of an exemplary system that utilizes cloud services to create, store, and retrieve child VMs. In the example of FIG. 3, a computing device 304 is in communication with the cloud services 302. The computing device 304 includes a processor 306, memory 308, and storage 307.

The memory 308 stores a plurality of VM templates 309. In some examples, VM templates 309 are arranged in a hierarchy, such as a tree hierarchy. However, aspects of the disclosure are operable with VM templates 309 stored in any structure. In such examples, VM templates 309 include a plurality of powered-on parent VM templates 310. The powered-on parent VM templates 310 may be created and maintained by the computing fabric cloud service and/or by cloud services 302, or by any other computing device 304. The parent VM templates 310 may be classified, categorized, or otherwise described as derived VM templates and standalone VM templates. Derived VM templates are derived from one of the parent VM templates 310, and inherit one or more disk blocks (e.g., "common" disk blocks) from that corresponding parent VM template 310. The standalone VM templates lack any such inherited disk block from parent VM templates 310. Aspects of the disclosure are operable with any form of disk block inheritance, such as via a redo log, array-level snapshots (e.g., using block reference counting), etc.

In some examples, each parent VM template 310 includes a virtual device state 318 for one of VMs 235 and a memory state 316 for that VM 235. Memory 308 further stores data describing a plurality of powered-on child VMs 311.

In some examples, cloud service 302 specifies whether to create a standalone template or a derived VM template (e.g., from another parent VM template 310). Cloud service 302 also creates a defined quantity of registered (e.g., to the cloud operating system) but powered-off child VMs 312 using a function call such as createChildren( ). The createChildren( ) function call also takes as input a childProperties argument which defines, for example, the identities (e.g., hostname, IP/MAC address, etc.) and particular processor and/or memory sizes of the child VMs. If the sizes are different from that of parent VM template 310, computing fabric cloud service may either add those resources when powering on child VM 311 (e.g., a "hot add") or create a new parent VM template 310. In addition, the childProperties argument also specifies how the created child VM 311 behaves when powered-on and/or reset. For example, the child VM 311 may act as an ephemeral entity that returns to the same, original parent state, or a regular VM 235 that goes through a usual boot process.

In the execution phase, child VMs 311 are instantiated using a function call such as powerOnChildren( ). The powerOnChildren( ) function call leverages fast VM 235 instantiation techniques, such as those as described herein, to quickly spawn VMs 235 with minimal processor overhead. Child VMs 311 may also be powered off or reset using the powerOffChildren( ) function call and a function call such as powerResetChildren( ).

The computing device 304 further includes storage 307. In contrast to memory 308, exemplary storage 307 includes one or more disks. Storage 307 stores data describing a plurality of powered-off child VMs 312. Each of the powered-off child VMs 312 is instantiated, on demand, from one of the plurality of parent VM templates 310. Until then, powered-off child VMs 312 do not occupy any memory resources. For example, powered-off child VMs 312 are present in storage 307 and, when powered-on, the child VMs 312 share memory pages with parent VMs and enter into memory 308, and the writes of the child VMs are entered into memory 308 as COW.

Child VMs have one or more properties, characteristics, or data associated therewith. Exemplary child VM properties include, but are not limited to, hostname, IP address, MAC address, domain identity, processor size, and/or memory size. In some examples, the child VM properties for each child VM (e.g., second VM) may be referred to as configuration data 313. Storage 307 further stores parent VM disks and child VM disks 314 (e.g., .vmdk files) for use by VMs 235.

After instantiation, powered-off child VMs 312 are registered (e.g., to a cloud operating system, or other management logic). The cloud operating system is executed by the computing device 304. Registration of one of powered-off child VMs 312 includes identifying powered-off child VM 312 to the cloud operating system, and occurs before powered-off child VM 312 is powered-on or otherwise executed. In this manner, powered-off child VM 312 is said to be pre-registered with the cloud operating system. In some examples, the cloud operating system is the hypervisor 210. By registering powered-off child VMs 312, the cloud operating system is no longer in the critical path when cloud services 302 commission VMs 235, thus reducing the amount of time needed for child VMs to become available. However, aspects of the disclosure are also operable with registration occurring on the child VM instantiation path.

In some examples, configuration data 313 for the child VM is defined, created, received, and/or registered prior to receiving a request to fork the child VM (e.g., from a management level application). In other examples, configuration data 313 is defined in response to receiving the request to fork the child VM 311. Configuration data 313 may be defined from default values set by an administrator, received in the request from the management level application, and/or populated with data from other sources. Exemplary configuration data 313 for the child VM 311 includes an IP address, a MAC address, a hostname, a domain identity, and/or any other state data to be applied when customizing the identity of the child VM 311. In some examples, configuration data 313 is stored in a file such as a .vmx file, with one file per child VM 311. Configuration data 313 may be registered with virtualization software, such as the cloud operating system.

In some examples, the computing device 304 defines a virtual device state of the child VM 311 based on a virtual device state 318 of the parent VM. For example, defining the virtual device state of the child VM 311 includes copying virtual device state 318 from the parent VM template 310. As another example, defining the virtual device state of the child VM 311 includes creating a COW delta disk referencing virtual device state 318 of the parent VM. Alternatively, the virtual device state of the child VM 311 depends, for example, on user criteria, the system capabilities or the applications the child VM 311 is running.

The computing device 304, in some examples, defines, creates, receives, and/or registers persistent storage for the child VM 311 based on persistent storage (.vmdk) of the parent VM template 310. In some examples, persistent storage for the child VM is stored in a file, such as a .vmdk file. For example, defining the persistent storage for the child VM 311 includes referencing persistent storage of the parent VM. In some examples, referencing persistent storage of the parent VM includes creating a read-only base disk referencing persistent storage of the parent VM, and creating a COW delta disk (associated with the child VM) to store changes made by the child VM 311 to the base disk.

In some examples, computing device 304 defines, creates, receives, and/or registers memory 308 for the child VM 311 based on memory state 316 of the parent VM. In some examples, referencing memory state 316 of the parent VM includes creating COW memory (associated with the child VM 311) to store changes made by the child VM 311 to memory state 316 of the parent VM. In this manner, the child VM 311 shares memory state 316 of the parent VM with COW memory pages, in contrast with linked clones that use COW delta disks.

The computing device 304 executes (e.g., powers on) the powered-off child VM 312, which becomes powered-on child VM 311. Execution of the powered-off child VM 312 includes configuring an identity of child VM 311 using configuration data 313. In some examples, execution of the powered-off child VM 312 includes configuration and execution of a boot process (or bootup process) to access and apply configuration data 313 to the powered-on child VM 311. In this manner, the powered-on child VM 311 customizes itself during bootup. The now-executing child VM 311 has a virtual device state that is a copy of virtual device state 318 of the parent VM, with persistent storage referencing persistent storage of the parent VM.

In some examples, the bootup process is executed by a guest operating system on the powered-on child VM 311. The bootup process includes, for example, a command to perform a synchronous remote procedure call (RPC) to the cloud operating system to obtain and apply configuration data 313. An example format for the RPC is "rpc 'info-get'".

The powered-on child VM 311 (or simply child VM), also known as the forked VM, may be configured in different ways, dependent in part on a type of guest operating system executing on child VM 311. One example for configuring an identity of child VM 311 is next described.

In some examples of the disclosure, the boot process applies customization to the child VM 311. The boot process includes a blocking agent that prevents the powered-off child VM 312 from completing bootup until certain operations have completed. For example, the blocking agent is injected into the boot process to prevent the guest operating system on the child VM 311 from accepting user-level commands until the identity of the child VM 311 has been configured.

The child VM 311, in some examples, accesses configuration data 313 that specifies a domain identity to be applied to the child VM 311. The domain identity is one of a plurality or pool of previously created domain identities available to the child VM 311. The plurality of domain identities are created, for example, by an administrator before the virtual device state of the child VM 311 and the persistent storage of the parent VM (e.g., disks 314) are defined.

The domain identity is pre-selected (e.g., explicitly identified in configuration data 313) in some examples, or selected during execution of the bootup process (e.g., based on characteristics of executing child VM 311). The specified domain identity is from the pool of previously created identities. Then the obtained domain identity is applied to the powered-on child VM 311. In some examples, applying the obtained domain identity includes performing an offline domain join operation, or any method that allows a computer system to join a domain without a reboot.

In operation, preparing the powered-on parent VM template 310 for forking may be performed, for example, by a guest agent residing inside a guest operating system of the powered-on parent VM template 310. The guest agent issues a fork command to quiesce the powered-on parent VM template 310 into the ready-to-fork state at an appropriate boot stage. As provisioning operations are initiated, the one or more powered-off child VMs 312 are forked without a committed identity. As the boot process begins inside each powered-on child VM 311, the various identities are applied to each powered-on child VM 311. For example, due to the forking process as described herein, a copy of the guest agent from the powered-on parent VM template 310 appears in each powered-on child VM 311. The copy of the guest agent resumes execution inside each powered-on child VM 311 as part of the boot process of the guest operating system. In this post-fork stage, for each powered-on child VM 311, the guest agent obtains (e.g., from a data store available to the guest operating system of the powered-on child VM 311) and applies one or more identities to the powered-on child VM 311. For example, the identities, or other parameters are stored as part of configuration data 313 in a .vmx file, or other file stored by the cloud operating system and accessible via API from within the guest operating system. In operation, the guest operating system synchronously requests and receives one of the identities from the cloud operating system to perform an offline domain join (e.g., update the identity in place) before proceeding through the tail end of the bootup process (e.g., before the system launches the logon service).

The operations discussed above may be embodied as computer-executable instructions stored on one or more computer-readable media. The instructions, when executed by processor 306, configure an identity of a forked VM 235 based on a pool of available domain identities.

The forking and state customization operations illustrated and described may be implemented using templates and an API to configure and deploy the powered-off child VM 312 in response to a request from cloud service 302. In an example, computing device 304 creates and maintains a hierarchy of parent VM templates 310 and powered-off child VMs 312 which are ready to be executed. Parent VM templates 310 are created, in some examples, in response to a request from at least one of cloud services 302. Alternatively or in addition, parent VM templates 310 are created on demand by computing device 304 after detecting patterns in VM 235 provisioning requests from cloud services 302. Maintaining the set of parent VM templates 310 includes, for example, powering-on each of parent VM templates 310. Each powered-off child VM 312 is instantiated from one of parent VM templates 310 in response to a request for the child VM. Maintaining the set of powered-off child VMs 312 includes, for example, pre-registering each instantiated powered-off child VM 312 to the cloud operating system (e.g., before being initiated or otherwise powered-on).

Alternatively or in addition, one or more of cloud services 302 may create and maintain one or more of parent VM templates 310.

In the teardown phase, parent VM templates 310 and child VMs 311 may be destroyed using function calls such as destroyParentTemplate( ) and destroyChildren( ). Depending on whether parent VM template 310 is part of the template hierarchy (e.g., a derived VM template) or a standalone template, destroying the template may not remove it completely from disk. The destroyChildren( ) function call turns off child VM 311 (e.g., power down) and resets the child VM properties such as identity, etc.

In automatic mode, rather than have parent VM templates 310 be explicitly created via the function calls available in manual mode, parent VM templates are automatically generated based on demand. For example, cloud service 302 uses a function call such as createChildrenAuto( ) to create child VMs. When a particular type of child VM is requested repeatedly (e.g., a plurality of requests are received for the same type of child VM), computing fabric cloud service creates a new powered-on parent VM template 310, deriving it from the appropriate parent VM template 310 in the hierarchy. This optimization further simplifies the setup and teardown phases by eliminating the need for cloud services 302 to explicitly create, destroy, and otherwise manage powered-on parent VM templates 310. In some examples, the new powered-on parent VM template 310 is created only if additional requests are expected for such VMs. For example, if the request for a particular VM 235 is a one-off request, the new parent VM template is not created.

VM instantiation operations are performed on VMs 235 stored in one or more datastores. Exemplary VM instantiation operations include, but not limited to, cloning, copying, forking, and the like. VM instantiation operations may be performed by virtualization products such as VMware's ESX brand software (e.g., in a kernel layer). In some examples, VM instantiation operations implement fast-suspend-resume technology with COW page references (e.g., rather than handing over pages entirely). While described in some examples herein with reference to VM forking routines, those of ordinary skill in the art will note that the disclosure is not limited to these VM forking routines. Rather, the disclosure is operable with any fast VM instantiation routines.

Figure 4:
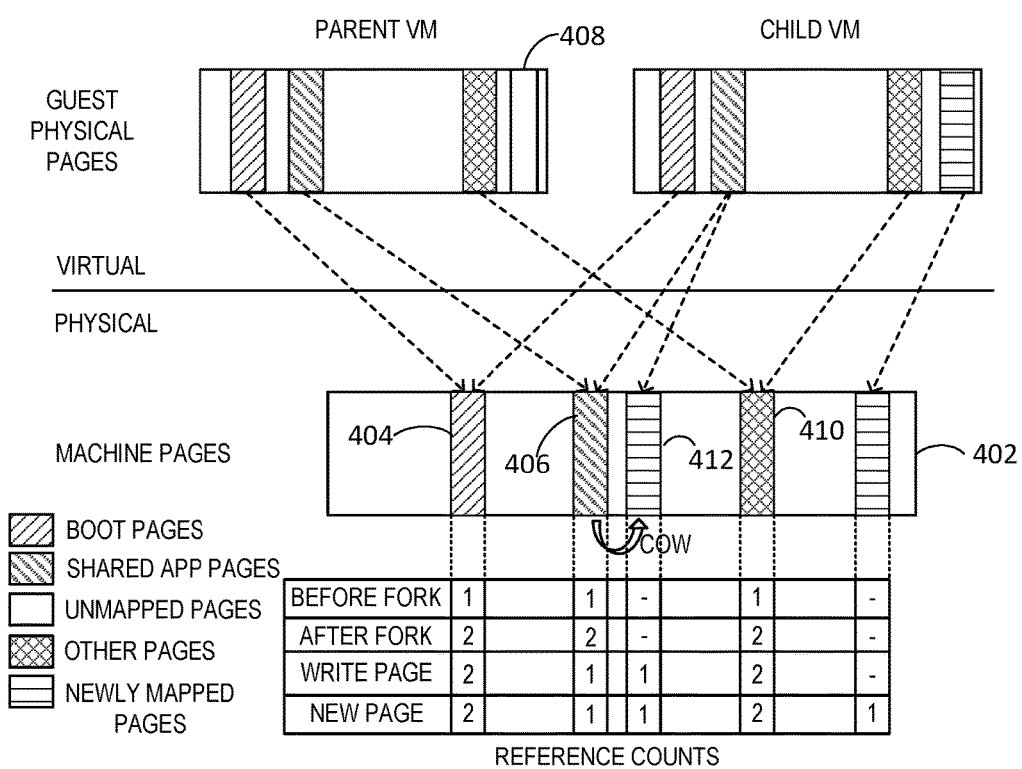
FIG. 4 is a block diagram illustrating the interrelation between child and parent VMs and their associated storage.

FIG. 4 is a block diagram illustrating the usage of a parent VM and child VM of common and exclusive machine pages. The relationship of the virtual and physical aspects of the disclosure are represented. A powered-on parent VM template 310 and a powered-on child VM 311 reside in the virtual space. Both the powered-on parent VM template 310 and a powered-on child VM 311 access machine pages 402 that are located on physical storage 307.

Five types of regions are illustrated on the machine pages 402. The first type of machine pages 402 illustrated are boot pages 404 (illustrated with lines slanting upwards from left to right). Shared application pages 406 (shared app pages) are illustrated with lines slanting downwards from left to right. Unmapped pages 408 are illustrated by white area on the representation of the parent VM. The unmapped pages 408 are represented, in this example, only on the powered-on parent template VM 310. In other examples, unmapped pages 408 may also be illustrated on the powered-on child VM 311. However, since they are unmapped, unmapped pages 408 are not illustrated on the machine pages 402. Other pages 410 created by the VMs are illustrated by crosshatches. Newly mapped pages 412 are illustrated by horizontal lines.

FIG. 4 illustrates the sharing of common pages between the powered-on parent VM template 310 and the powered-on child VM 311. In the example of FIG. 4, before the powered-on child VM 311 is created (also referred to as "before fork") the only existing pages are the boot pages 404, shared application pages 406, and other pages 410. The only VM that is using those pages is the powered-on parent VM template 310, so the "reference counts" for those pages is 1. The powered-on parent VM template 310 is then forked, creating a powered-off child VM 312, which is executed to create the powered-on child VM 311. After the fork occurs, two VMs point to the boot pages 404, powered-on parent VM template 310 and the powered-on child VM 311. Likewise, both the powered-on parent VM template 310 and the powered-on child VM 311 point to the shared application pages 406 and the other pages 410 after the fork. Consequently, each of these pages has a reference count of 2, in this example, as both the powered-on parent VM template 310 and the powered-on child VM 311 are pointing to them. In another example, there could be more reference counts to these pages if more powered-on child VMs 311 are executed.

After forking, but before creating any new content, the powered-on child VM 311 has no independent pages, but rather relies on the stored pages on the parent VM disk 314. The computing device 304 tags, marks, configures, or otherwise indicates that persistent storage of the parent VM is COW. Tagging the persistent storage and memory 308 of the powered-on parent VM template 310 as COW prevents the parent VM from modifying persistent storage or memory 308 that the powered-on child VM 311 is relying upon. Instead, if the powered-on parent VM template 310 attempts to modify either persistent storage 307 or memory 308, a copy of that data is created for the powered-on parent VM 310 leaving the original persistent storage 307 or memory 308 intact.

Once the powered-on child VM 311 writes, it creates its own copy of a page, a copy on write (COW) version of that page. In the example of FIG. 4, the child VM writes to the shared application pages 406, thus creating a COW page, the newly mapped page 412 in the figure. Once this new write has occurred, the powered-on parent VM template 310 still points to the shared application pages 406, but the powered-on child VM 311 now points to its newly mapped page 412. FIG. 4 reflects that after the COW pages are created, the powered-on child VM 311, in this example, does not point to the shared application pages 406 of the powered-on parent VM template 310, and thus the reference count for the shared application pages 406 drop to 1. The reference counts for the newly mapped pages 412 increase to 1, since the powered-on child VM 311 created that new page and now points to it. The reference counts for the boot pages 404 and the other pages 410 remain at 2, since in the example illustrated both the child VM 311 and the powered-on parent VM template 310 still point to those pages.

After the powered-on child VM 311 has created a newly mapped page 412, the powered-on child VM 311 writes that page to the physical machine pages 402. After that newly mapped page 412 is written, there is one reference to it, by the powered-on child VM 311. In the example of FIG. 4, there are two newly mapped pages 412 created.

The first newly mapped page 412 is a modification of an existing page stored by the powered-on parent VM template 310. In some examples, the newly mapped page 412 points back to the shared application pages 406 which it modifies, and only the changes made by the powered-on child VM 311 to the shared application pages 406 are recorded on the newly mapped pages 412. In other examples, the powered-on child VM 311 no longer relies on the powered-on parent VM template 310 for the modified shared application pages 406, and instead the powered-on child VM 311 only utilizes its newly created page.

The second newly mapped page 412 is original content created by the powered-on child VM 311. That newly mapped page 412 does not indicate that it is a modification of any previously existing page. Instead, that newly mapped page 412 is solely tied to the powered-on child VM 311, and only the powered-on child VM 311 references it, in some examples.

Figure 6:
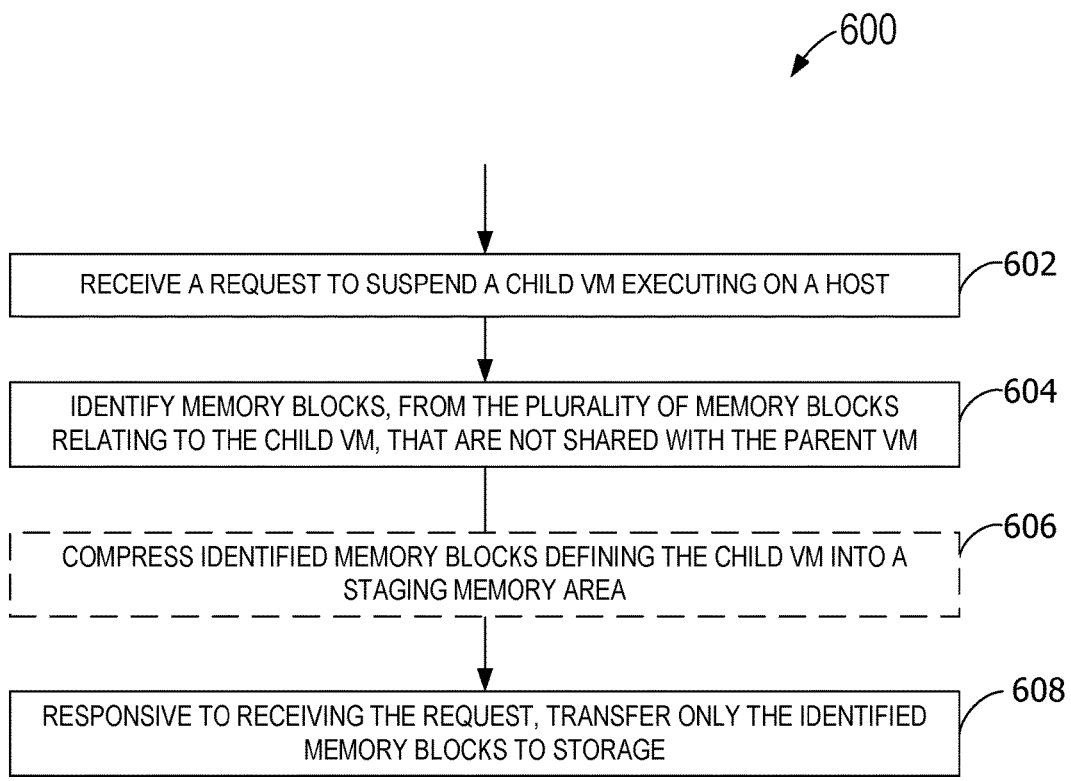
FIG. 6 is a flowchart of an exemplary method of suspending and storing a child VM.
Figure 7:
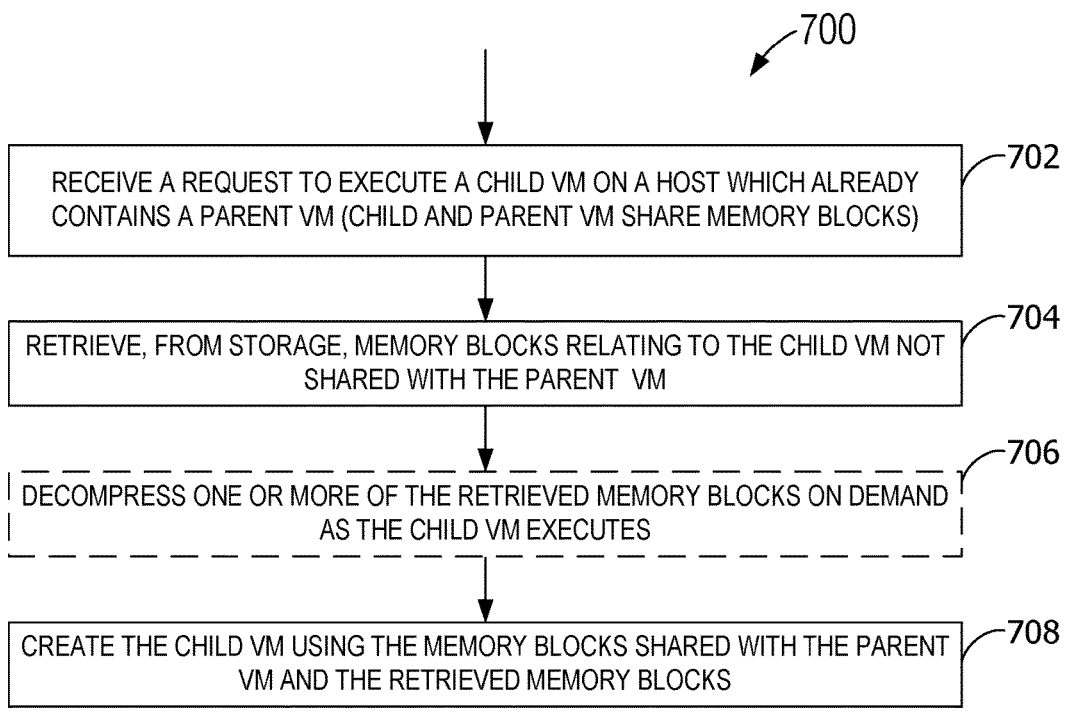
FIG. 7 is a flowchart of an exemplary method of retrieving from storage and resuming execution of a child VM.

In the present disclosure, the powered-on child VM 311, under the methods disclosed and illustrated by FIGS. 6 and 7, is suspended and executed based on the references to the powered-on parent VM template 310, and based on content created which solely relates to the powered-on child VM 311, in some examples. In the present example, if the powered-on child VM 311 illustrated were suspended, the pages that it does not share with the powered-on parent VM template 310 would be written to storage. For instance, in FIG. 4 the newly mapped pages 412 are distinct from pages shared with the powered-on parent VM template 310. The newly mapped pages, under method 600, would be sent to storage as part of the suspension of the powered-on child VM 311.

Figure 5:
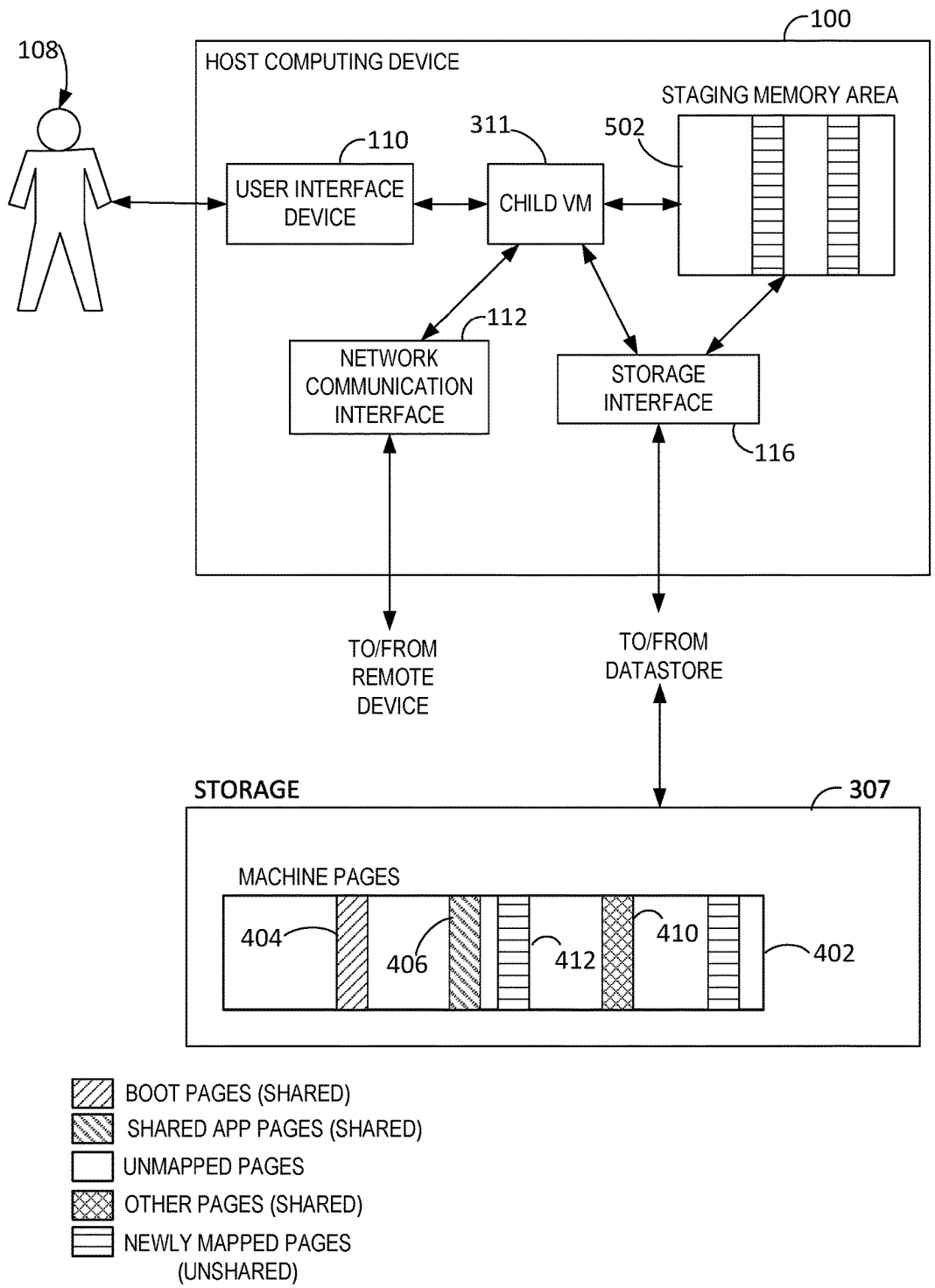
FIG. 5 is a block diagram of an exemplary system with a child VM sharing machine pages with a parent VM.

FIG. 5 is a block diagram of an exemplary system with a powered-on child VM 311 sharing machine pages with a powered-on parent VM template 310. Host computing device 100 includes a user interface device 110 for use by user 108. A powered-on child VM 311 is located on the host computing device 100. The powered-on child VM 311 connects to a staging memory area 502, a remote device through a network communication interface 112, and storage 307 through a storage interface 116. The storage 307 in this illustration is remote. However, the storage 307 is local in other examples.

The powered-on child VM 311 shares pages with its powered-on parent VM template 310. The powered-on parent VM template 310 maintains various machine pages 402 on storage 307. In FIG. 5, storage 307 refers to memory and/or storage. However, in some examples, storage 307 may refer only to memory in host computing device 100, and exclude storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as vCenter Server from VMware, Inc. or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In some examples, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

In the illustrated example, the powered-on child VM 311, in accordance with the method illustrated in FIG. 6, accesses various machine pages 402 located on the storage 307. The powered-on child VM 311 does not alter the pages it shares with the powered-on parent VM template 310. For instance, in the present example, the boot pages 404, shared application pages 406, and various other pages 410 are shared with the powered-on parent VM template 310. As the powered-on child VM 311 operates, in some examples it attempts to alter the machine pages 402 it shares with the powered-on parent VM template 310. When a powered-on child VM 311 attempts to write to one of the shared pages, instead it creates a new, COW page. The COW pages, illustrated as newly mapped pages 412, are in some examples initially written to a staging memory area 502. In the staging memory area 502, the pages may be compressed before writing to the storage 307. Only pages that the powered-on child VM 311 maintains exclusively are written by the child VM 311 to storage 307, in this example. Other pages, shared by the powered-on child VM 311 and the powered-on parent VM template 310 are maintained by the powered-on parent VM template 310.

In some examples, the powered-on child VM 311 creates an entirely new page when it attempts to alter a page maintained by the powered-on parent VM template 310. In other examples, the powered-on child VM 311 maintains a log of changes made to a page hosted by the powered-on parent VM template 310. In the second example, when the powered-on child VM 311 is executed after a period of suspension, the altered pages may be recreated upon demand based on the log of changes.

FIG. 6 is a flowchart of an exemplary method of suspending and storing a powered-on child VM 311. The method 600 of suspending and storing a powered-on child VM 311 is initiated by a request to suspend a powered-on child VM 311 at 602. The request is initiated, in some examples, by a user 108. In other examples, the request is initiated at pre-programmed times, for instance on a three times a day basis. Alternatively, the request is initiated when the system detects an idle time of powered-on child VM 311 usage exceeding a programmed threshold. In some examples, the request occurs after the powered-on child VM 311 has written a certain quantity of data.

At 604, the powered-on child VM 311 compares its memory blocks to the memory blocks of the powered-on parent VM template 310, resident on the same host, and identifies any memory blocks that the powered-on child VM 311 does not share with the powered-on parent VM template 310. The memory blocks which are identified are, in some examples, COW memory blocks.

Optionally, at 606 the identified blocks are compressed. In some examples, some of the identified blocks are compressed, while some remain uncompressed. In examples where compression occurs selectively, identified memory blocks are compressed, for example, based on system and usage restraints, or based on protocols defined by the user 108.

At 608, the identified memory blocks are transferred to storage 307. In some examples, the identified memory blocks are transferred to storage 307 immediately. In other examples, the identified memory blocks are transferred after a period of idle time. The identified memory blocks are also, in some examples, transferred after a user 108 has logged off, on a rotating schedule, when shifts change, at the request of a user 108, or on any other programmed basis.

In some examples, the powered-on child VM 311 is replicated to a plurality of host computing devices 100. This replication permits the suspended powered-on child VM 311 to be resumed on any of the host computing devices 100. This permits users 108 to operate desktops as a service. A user 108 accesses the same powered-on child VM 311 on different host computing devices 100 depending on the needs of the user 108. This results in a virtual desktop experience, wherein the user 108 accesses the same powered-on child VM 311, from a stored powered-off child VM 312 state, regardless of the physical location of the user 108.

FIG. 7 is a flowchart of an exemplary method 700 of retrieving from storage and resuming execution of a child VM. At 702, a request is received to retrieve and resume execution of a powered-off child VM 312. The request is initiated, in some examples, by one of the users 108. In other examples, the request is initiated at pre-programmed times, for instance on a three times a day basis, in anticipation of requests from users 108. At 704, the memory blocks that are associated with the powered-off child VM 312, but are not associated with the powered-on parent VM template 310, are retrieved from storage. In some examples, no memory blocks are retrieved, as the powered-on parent VM template 310 and powered-off child VM 312 are identical.

If any of the retrieved memory blocks are compressed, at 706 the compressed memory blocks are decompressed. In some examples, all of the retrieved memory blocks are compressed. In alternative examples, none of the retrieved memory blocks is compressed. Alternatively, some memory blocks are compressed and the remainder are uncompressed. In other examples, the memory blocks are not decompressed until they are utilized by the powered-on child VM 311.

The powered-off child VM 312 is then executed becoming the powered-on child VM 311, at 708, utilizing memory blocks shared with the powered-on parent VM template 310 and the retrieved memory blocks. In some examples, the powered-on child VM 311 is executed on more than one host computing device 100.

To prepare the powered-off child VM 312 for execution, the child VM is configured to leverage the existing memory, device, and disk state of the powered-on parent VM template 310. To share the disk of the powered-on parent VM template 310, the child VM is configured with a redo log pointing to the disk of the powered-on parent VM template 310 as the base disk of the child VM (e.g., similar to a linked clone VM). In addition, the powered-on child VM 311 may be configured with its own dedicated storage that is not related to the powered-on parent VM template 310. For example, the dedicated storage may include a data disk or access to shared storage if the powered-on child VM 311 desires to persist state in storage other than its redo log.

A configuration file (e.g., .vmx file) associated with the powered-off child VM 312 is updated to indicate that the powered-off child VM 312 inherits the memory and device state of the powered-on parent VM template 310 upon power-on. The configuration file may also be updated with additional information, such as a desired MAC address and IP address for the powered-off child VM 312 to be associated with it upon power-on. The configuration file is registered with the cloud operating system (e.g., executing on a host), and the powered-off child VM 312 is ready to be powered-on on demand.

In some examples, the redo log of the powered-off child VM 312 is marked as non-persistent. In such examples, upon each power-on, the powered-on child VM 311 inherits a fresh copy of the memory, device, and disk state of the powered-on parent VM template 310 (e.g., re-forks from the quiesced image of the powered-on parent VM template 310). In other examples, the redo log of the powered-off child VM 312 is marked as persistent.

After preparation, the powered-off child VM 312 is ready to be powered-on (e.g., spawned) upon receipt of a power-on request (e.g., from cloud service 302 or from computing fabric cloud service). In response to receipt of such a power-on request, the now powered-on child VM 311 inherits the memory state 316 and device state 318 of parent VM template. As such, rather than performing a normal boot process, such as through the basic input output system (BIOS), the powered-on child VM 311 instead resumes from the state of powered-off child VM 312. For example, the powered-on child VM 311 inherits a COW reference to the memory state 316 of parent VM template, such as shown in FIG. 4. Referencing COW memory on the same host eliminates overhead for unmapped pages and results in a small overhead for mapped pages (e.g., less than one microsecond for four kilobyte pages), thus providing fast powered-on child VM 311 instantiation. FIG. 4 also illustrates the reference counts for each of the example pages shown in the figure before and after forking, when writing a page, and when creating a new page.

Further, by referencing COW memory, the powered-on child VM 311 is able to begin execution in a fraction of a second from the precise instruction (e.g., fork guest RPC) at which powered-on parent VM template 310 was quiesced. From the perspective of the powered-on child VM 311, the powered-on child VM 311 sees the fork guest RPC returning successfully from hypervisor 210. The powered-on child VM 311 may then be migrated away from the powered-on parent VM template 310 without need for one-to-many migrations (e.g., one-to-many vMotion operations).

Computing fabric cloud service handles return of the fork guest RPC by customizing the child VM. Customizing the child VM includes, for example, reading and applying a desired configuration state from the configuration file specified when preparing the child VM. As described herein, some examples customize the child VM by identifying and applying a MAC address, IP address, hostname, and other state to the child VM. Leveraging the customization data, the child VM may then spoof its MAC address to the desired MAC address, update its hostname, IP address, etc., and bring up its network interface. The child VM then continues execution as a unique VM (e.g., separate from parent VM) with its own identity Parent VM Residency on All Hosts Aspects of the disclosure contemplate a policy-based driver mechanism to replicate and instantiate the parent VM on each of the hypervisors in the cluster. VMs are provisioned using a forking-based strategy that involves maintaining a parent VM in memory on each host in the cluster and every cluster on the hybrid cloud where VMs may be migrated. The parent VM image is specific to each OS type so for example, if a cluster is used for Linux, Windows 7, and Windows 2008R2, three generic parent VM images need to be available on each host, in some examples. This memory overhead is taken into account for planning purposes so the sum of memory allocations for each parent VM is deducted from projections for the memory available to working VMs. Because live migration of child VMs (e.g., using vMotion from VMware, Inc.) presumes logical attachment of unique memory pages to an identical parent VM image on the target host, the parent VM is replicated from the original host on which it was prepared and transferred onto all target hosts. Creating separate parent VMs on each host does not work, in some examples, because each host's parent VM is slightly different and not able to logically bind their shared pages to children from other hosts. Instead, aspects of the disclosure boot up a parent VM on one host (e.g., a seed host), get the parent VM to a state for forking, and copy the parent VM image to each hypervisor of the other hosts in the cluster or target hosts in the remote clusters containing target hosts to create replicas on those hosts. The suspended child VM may then be resumed on any host in the cluster because all parent VMs on the cluster are identical. Likewise, child VMs may be migrated to any target host with an identical parent VM resident in memory. Aspects of the disclosure contemplate a policy-based driver mechanism to replicate and instantiate the parent VM on each of the hypervisors in the cluster or to clusters of hosts or hosts at remote datacenters.

Maintenance Operations

Aspects of the disclosure contemplate various cleanup and/or maintenance operations. For example, if a parent VM closes (e.g., the host reboots), aspects of the disclosure eliminate, or otherwise flag, suspended child VMs associated with that parent VM because those child VMs may no longer resume.

If a cluster shuts down or restarts, aspects of the disclosure contemplate a mass resume operation by resuming the parent VM on each host (e.g., by transferring over the network via vMotion or replication, or resuming from disk if from a local cluster), and then resuming the child VMs.

VMFork

Additional description of forking or other similar operations is next provided.

Examples herein instantly fork and configure live child VMs from a powered on parent VM with underlying memory and disk resource sharing. In some examples, a script is executed to customize a state of each new forked VM to produce a child VM with a different state than the parent VM. For example, based on a virtual device state 318 of a suspended parent VM (e.g., a first VM), a virtual device state of the child VM (e.g., a second VM) is defined. Persistent storage of the child VM is also defined based on persistent storage of the parent VM.

Examples further configure a state of each newly-instantiated child VM based on configuration data 313 for the child VM, including configuring one or more identities on the fork path. The identities are configured without involving a reboot of the child VM, despite any guest operating system level restrictions requiring reboot operations when configuring identities. Rebooting the child VM prevents the memory page sharing achieved by the forking operations described herein at least because the memory page sharing would be lost with the reboot. In this manner, aspects of the disclosure are operable to "instantly" provision child VMs. Further, eliminating reboot operations reduces overall provisioning time, which reduces overall cost of ownership for users. The level of boot storm is also significantly reduced when customizing large quantities of child VMs, thus reducing input/output commands per second (IOPS) at the storage array level. Reducing IOPS reduces storage cost for users.

An exemplary identity set includes, but is not limited to, one or more of the following items: computer name, domain machine account with domain join, license client machine identifier with key management service (KMS) volume license activation, media access control (MAC) address, and/or Internet Protocol (IP) address. For example, a domain identity is selected, at fork time, from a pool of previously created domain identities. The selected domain identity is applied to the child VM in a way that does not confuse existing processes in the child VM. For example, some examples prevent boot completion of the child VM until customization has finished.

In some examples, the forking and identity configuration operations are implemented as part of a shared computing fabric cloud service that efficiently supports fast, elastic, and automatic provisioning of VMs for multiple cloud services 302 (e.g., tenants of the computing fabric cloud service). Some examples of computing fabric cloud service present an application programming interface (API) that may be leveraged by many of cloud services 302 to quickly scale in and scale out of VMs, such as VMs 235, based on demand. In operation, cloud services 302 request resources and properties of the resources, and computing fabric cloud service makes the resources available immediately, instantaneously, or otherwise faster than existing systems.

Aspects of the disclosure include a shared infrastructure (e.g., computing fabric cloud service) accessible via an API that enables quick provisioning of VMs 235 by managing a hierarchy of powered-on templates and employing fast VM instantiation operations to quickly spawn VMs 235 with desired properties. Some examples store parent VM templates 310 in a tree hierarchy with each parent VM template 310 representing a linked clone of its parent with its memory shared via copy-on-write (COW). In some of those examples, a set of child VMs, pre-registered to a cloud operating system, is internally maintained for each template. The child VMs are created as a linked clone of the corresponding parent VM template 310. When one of cloud services 302 commissions or otherwise requests provisioning of one or more VMs 235, aspects of the disclosure create a COW share of parent VM template 310 memory to give to requesting cloud service 302.

In this manner, and as described further herein, the computing fabric cloud service supports the instantaneous provisioning of VMs 235 on demand, allows for memory and disk content sharing across cloud services 302 using parent VM templates 310 common to cloud services 302, and improves cloud service 302 performance by eliminating use of hot spare VMs 235.

Examples are operable with any cloud service 302, such as those managing very large datasets (e.g., "big data"), those supporting virtual desktops, and those providing a cloud computing platform as a service or other cloud service provider (e.g., CLOUD FOUNDRY brand computer services). In part by creating and managing parent VM templates 310 as described herein and performing the forking routines, aspects of the disclosure are able to instantly provision (e.g., under a second) these and other cloud services 302 with fully functional VMs 235 with low (e.g., minimal) processor overhead.

Example Implementation of Forking with Identity Configuration

Aspects of the disclosure are operable with any type, kind, form, or model of guest operating system to be executed by the parent VM and child VMs. For child VMs with guest operating systems, such as the WINDOWS brand operating system, that require a reboot to apply identity settings, some examples operate to apply a set of identities without requiring a reboot. An example set of identities includes computer name, domain machine account with domain join, license client machine identification with a key management service (KMS) volume license activation, MAC address, and IP address. To eliminate the reboot, these examples contemplate execution of two components within a guest agent residing inside the parent VM. One component is a native application while the other component is a service (e.g., a post-fork identity service). The native application is executed at the beginning of session manager initialization, which occurs after a boot loader phase and a kernel initialization phase of the bootup process. The post-fork identity service is a system service launched by a service control manager, and configured such that other services (e.g., a Netlogon service, a software protection platform service, and a TCP/IP protocol driver service) are dependent on this service, as further described below.

The native application executes, as the parent VM is powered on and boots up, to issue the fork command. The fork command quiesces the parent VM into a ready-to-fork state. By setting the forking point of the parent VM at the beginning of session manager initialization, the computer name may be set before subsystems and any system services of the guest operating system refer to the computer name. By preventing the subsystems and system services from referring to the computer name, conflicts are avoided thus eliminating any potential reboot threat. Then, as each child VM is forked during the fork process, the native application continues its execution inside the guest operating system of each child VM.

As the native application resumes execution inside each child VM, the set of identities is applied to each child VM. In an example involving one child VM, the native application applies the computer name change to directly set the new name to a full list of registry entries, or other configuration entries.

In another example, a domain machine account with domain join is achieved in two phases. The first phase may be performed by any application (e.g., external to the child VM) before each child VM is forked. The first phase includes pre-creating a machine account for each forked child VM against a directory service of the target domain. The application passes the machine password of the pre-created machine account to each child VM as an identity value. The second phase occurs after forking the child VM (e.g., during a post-fork stage) and is executed by a post-fork identity service associated with a guest agent inside the guest operating system of each child VM. The post-fork identity service retrieves the pre-specified machine password and directly inserts it into the machine private data store. After this, the machine password stored inside the guest operating system of each child VM now matches the corresponding computer account password stored in the directory service of the target domain, thus completing the domain join.

Aspects of the disclosure configure authentication services (e.g., Netlogon) in the child VM to not start until after the domain join has been completed, to prevent attempts to authenticate the guest computer and/or users 108 against the target domain. In this way, the authentication services depend on the post-fork identity service.

A license client machine identifier, with KMS volume license activation in some examples, is also obtained by the post-fork identity service. First, the cached content files that store the existing license activation status and the client machine identifier copied from the parent VM are removed. After the post-fork identity service completes its startup, a KMS volume license activation command is issued to activate the volume license and generate a new license client machine identifier.

Aspects of the disclosure configure software validation/activation services (e.g., Software Protection Platform) in the child VM to not start until after the license client machine identifier has been generated, to prevent attempts to validate software associated with the child VM. In this way, the software validation/activation services depend on the post-fork identity service.

The MAC address setting is also performed by the post-fork identity service. To set a new MAC address for a network adapter associated with the child VM, the post-fork identity service directly sets the MAC address through its network address property, and then disables and re-enables the network adapter. Aspects of the disclosure configure communication services (e.g., a TCP/IP service) in the child VM to not start until after the new MAC address has been set, to prevent potential conflicts (e.g., a TCP/IP conflict). In this way, the communication services depend on the post-fork identity service.

The IP address setting depends on whether the configuration uses dynamic host configuration protocol (DHCP) or a static IP. For DHCP configuration, the forking point is placed before the DHCP client service is launched, so no additional work is performed by the guest agent during the post-fork stage to configure the IP address. Once each child VM is forked, the DHCP client service starts and obtains an IP address from the DHCP server automatically.

In a static IP configuration, the post-fork identity service sets the IP address of a network adapter, and then disables and re-enables the network adapter. Aspects of the disclosure configure communication services (e.g., a TCP/IP service) in the child VM to not start until after the new IP address has been set, to prevent potential conflicts (e.g., a TCP/IP conflict). In this way, the communication services depend on the post-fork identity service.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute exemplary means for rapidly suspending a VM. For example, the elements illustrated in the figures, such as when encoded to perform the operations illustrated in the figures, constitute exemplary means for receiving a request to suspend a VM executing on a host, the VM having a plurality of memory blocks at least a portion of which are shared with another VM, wherein the another VM is resident in the host, exemplary means for identifying memory blocks, from the plurality of memory blocks, that are not shared with the another VM, and exemplary means for transferring only the identified memory blocks to storage responsive to receiving the request.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A method comprising:

receiving a request to resume execution of a suspended child virtual machine (VM) on a host machine, the child VM being one of a plurality of child VMs of a powered-on parent VM template, wherein respective child VMs of the plurality of child VMs are individually suspended and resumed while the parent VM template remains powered-on;

retrieving memory blocks that are associated with the suspended child VM, but are not associated with the powered-on parent VM template; and executing the suspended child VM to produce a powered-on child VM including logically merging the loaded memory blocks of the suspended child VM with memory blocks shared with the powered-on parent VM template that are maintained resident in memory on the host through the powered-on state, wherein executing the suspended child VM includes using configuration data that specifies a memory state and a device state of the powered-on parent VM template to inherit such that the powered-on child VM resumes without undergoing a boot process.

2. The method of claim 1, further comprising: determining whether one or more of the retrieved memory blocks are compressed, and if so, decompressing the one or more memory blocks.

3. The method of claim 1, wherein the suspended child VM includes a log having pointers to a disk of the powered-on parent VM template as a base disk of the child VM.

4. The method of claim 3, wherein the log is non-persistent so that upon each execution of the suspended child VM, the powered-on child VM inherits a fresh copy of memory and device state from the powered-on parent VM template.

5. The method of claim 1, wherein the powered-on child VM is configured to use separate storage that is not related to the powered-on parent VM template.

6. The method of claim 1, wherein the suspended child VM includes configuration information indicating that the suspended child VM inherits memory and device state of the powered-on parent VM template upon execution.

7. The method of claim 1, further comprising:
receiving a request to suspend the powered-on child VM;
identifying memory blocks that are not shared with the powered-on parent VM template; and
transferring the identified memory blocks to storage.

8. The method of claim 1, wherein receiving the request comprises receiving the request from a user.

9. The method of claim 1, wherein the request is initiated at pre-programed times in anticipation of requests from one or more users.

10. A system comprising:
a memory area associated with a computing device, said memory area storing a plurality of memory blocks associated with a plurality of virtual machines (VMs) and a processor programed to perform operations comprising:
receiving a request to resume execution of a suspended child virtual machine (VM) on a host machine, the child VM being one of a plurality of child VMs of a powered-on parent VM template, wherein respective child VMs of the plurality of child VMs are individually suspended and resumed while the parent VM template remains powered-on;
retrieving memory blocks that are associated with the suspended child VM, but are not associated with the powered-on parent VM template; and
executing the suspended child VM to produce a powered-on child VM including logically merging the loaded memory blocs of the suspended child VM with memory blocks shared with the powered-on parent VM template that are maintained resident in memory on the host through the powered-on state, wherein executing the suspended child VM includes using configuration data that specifies a memory state and a device state of the powered-on parent VM template to inherit such that the powered-on child VM resumes without undergoing a boot process.

11. The system of claim 10 further configured to perform operations comprising:
determining whether one or more of the retrieved memory blocks are compressed, and if so, decompressing the one or more memory blocks.

12. The system of claim 10, wherein the suspended child VM includes a log having pointers to a disk of the powered-on parent VM template as a base disk of the child VM.

13. The system of claim 12, wherein the log is non-persistent so that upon each execution of the suspended child VM, the powered-on child VM inherits a fresh copy of memory and device state from the powered-on parent VM template.

14. The system of claim 10, wherein the powered-on child VM is configured to use separate storage that is not related to the powered-on parent VM template.

15. The system of claim 10, wherein the suspended child VM includes configuration information indicating that the suspended child VM inherits memory and device state of the powered-on parent VM template upon execution.

16. The system of claim 10, further configured to perform operations comprising:
receiving a request to suspend the powered-on child VM;
identifying memory blocks that are not shared with the powered-on parent VM template; and
transferring the identified memory blocks to storage.

17. The system of claim 10, wherein receiving the request comprises receiving the request from a user.

18. A method comprising:
receiving a request to suspend a child virtual machine (VM) executing on a host machine of a plurality of child VMs generated from a powered-on parent VM template resident on the same host, wherein respective child VMs of the plurality of child VMs are individually suspended and resumed while the parent VM template remains powered-on, wherein each child VM shares a first plurality of memory blocks with the parent VM template, the shared memory blocks including boot pages and shared application pages, and wherein each child VM stores new writes to a separate plurality of non-shared memory blocks as copy on write versions of the corresponding shared pages and;
in response to the request to suspend the child VM, suspending the child VM including:
identifying memory blocks of the child VM that are not shared with the parent VM template; and
transferring only the identified memory blocks of the child VM that are not shared with the parent VM template to a storage memory.

19. The method of claim 18, wherein the identified memory blocks of the child VM are transferred after a period of idle time.

20. The method of claim 18, wherein identifying memory blocks comprises comparing the memory blocks of the child VM to the memory blocks of the parent VM template.

* * * * *